March 13, 1956  J. A. McCORMICK  2,737,903
RAILROAD ARTICULATED VEHICLE
Filed May 11, 1950  2 Sheets-Sheet 1
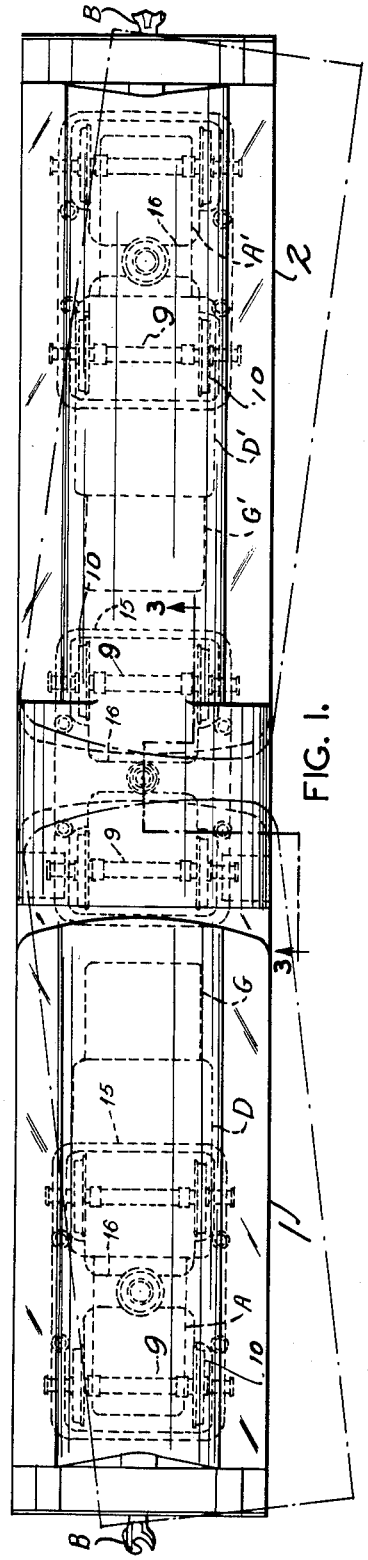
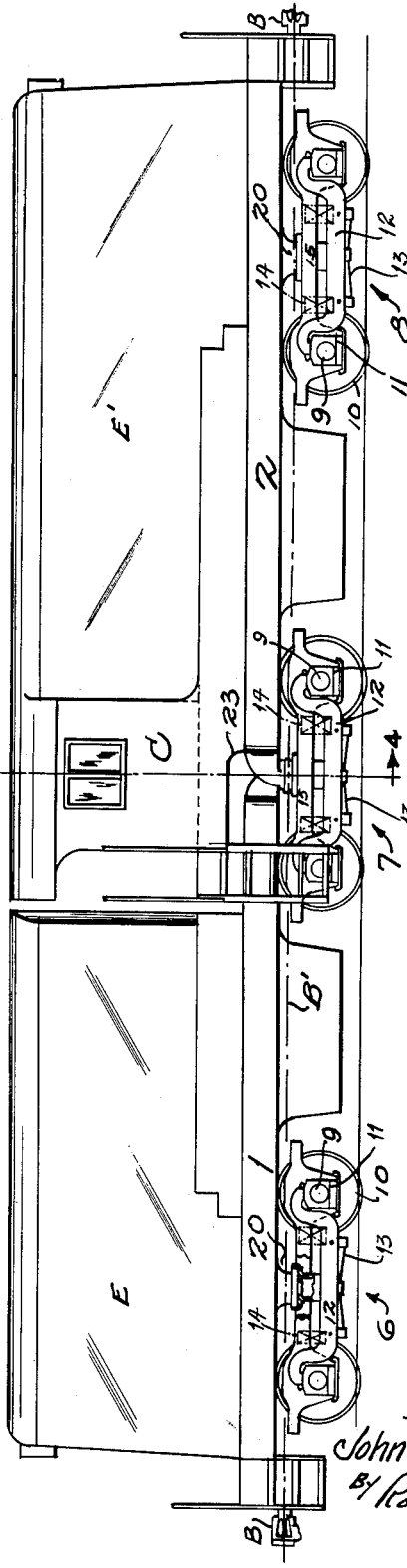
Inventor
John A. McCormick
By Rodney Bedell
Atty.

March 13, 1956   J. A. McCORMICK   2,737,903
RAILROAD ARTICULATED VEHICLE
Filed May 11, 1950   2 Sheets-Sheet 2
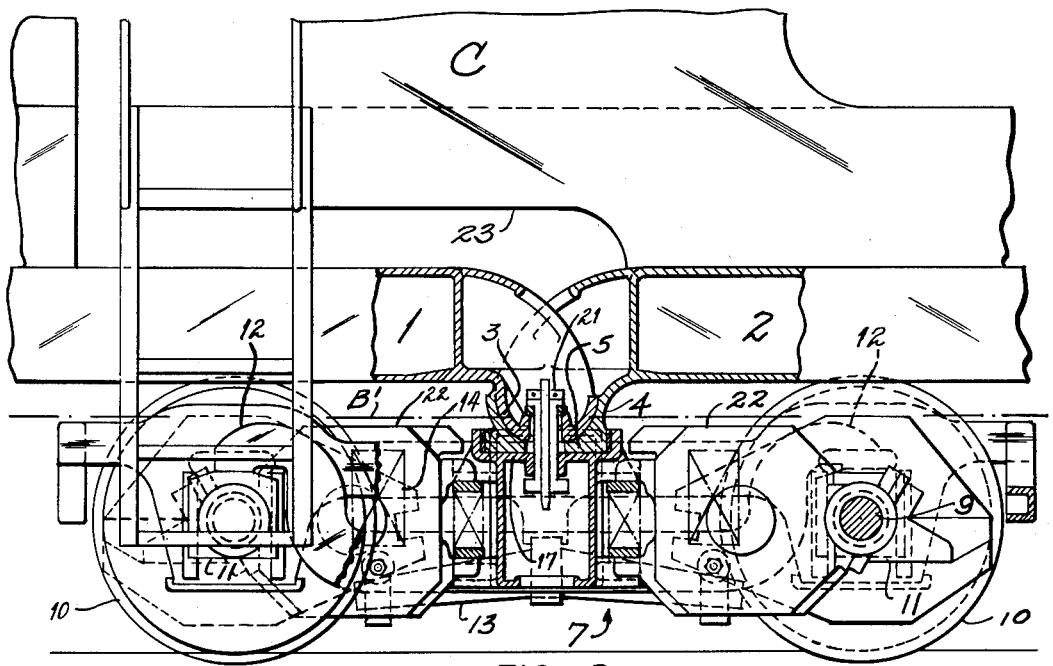
FIG. 3.
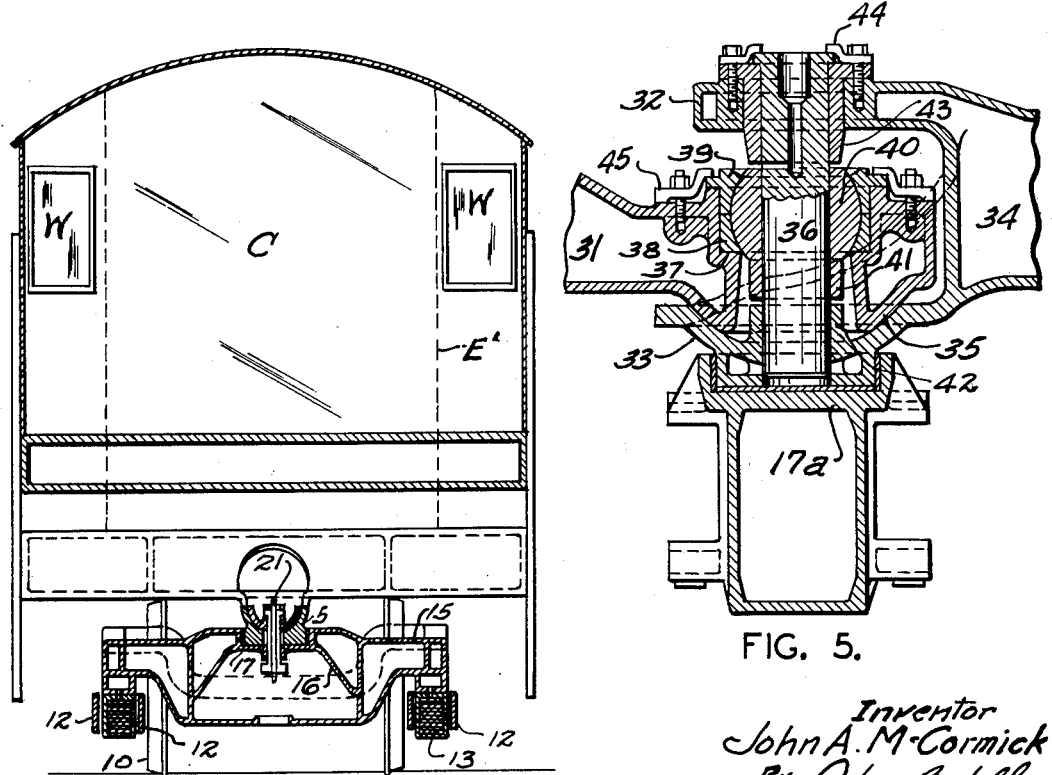
FIG. 4.
FIG. 5.
Inventor
John A. McCormick
By Rodney Bedell
Atty.

United States Patent Office 2,737,903
Patented Mar. 13, 1956

2,737,903
RAILROAD ARTICULATED VEHICLE

John A. McCormick, Evanston, Ill., assignor to General Steel Castings Corporation, Granite City, Ill., a corporation of Delaware Application May 11, 1950, Serial No. 161,322

3 Claims. (Cl. 105—4)

The invention relates to railway rolling stock and more particularly to an articulated vehicle preferably comprising a locomotive of diesel engine, electric generator, motor driven truck type, such as is well-adapted for switching and like service.

The main object of the invention is to provide a locomotive of such power that at least six driving axles are required but which will negotiate tracks with sharp curves without undue overhang of the locomotive transversely of the track, either at the coupler ends of the locomotive or at the middle of the locomotive, and will also negotiate tracks having high and low spots while at the same time distributing the locomotive load in predetermined amounts for each axle irrespective of track irregularities.

This object is accomplished in the present invention by providing a locomotive with a pair of frames preferably having a power generating unit on each frame, with the frames connected to each other at their adjacent ends so as to pivot relatively to each other about vertical and horizontal axes, there being three motor driven trucks under the pair of frames with the middle truck under the pivotal connection between the frames to support the adjacent ends of the frames.

This construction distinguishes from a locomotive of the same power having six driving axles and comprising a single frame and two six wheel motor trucks at each end portion of the locomotive. This arrangement is undesirable in negotiating sharp curves due to the excessive overhang of the locomotive framing transversely of the track when on curves. The present construction also distinguishes from a locomotive of the same power having six driving axles and comprising a single frame and three four wheel motor trucks, one under the middle portion of the locomotive, which is undesirable for negotiating track having high and low spots because when the locomotive is on such track the load distribution on each truck changes whereby at certain times one or two trucks as well as the rails would be overloaded. The change in the load distribution is due to the following conditions: when the middle truck is over a high spot in the rail it would take an additional load and the end trucks would be relieved of some of their load, and when the middle truck is over a low spot it would be relieved of some of its load and additional load would be applied to the end trucks.

Another object is to distribute the locomotive load equally to all three trucks.

Another object is to have all of the trucks interchangeable.

Another object is to embody a locomotive of given power in a minimum length with equal distribution of load to all of the wheels.

Another object of the invention is to utilize a single operator's cab which is positioned intermediate the ends of the locomotive and over the middle truck so that the locomotive may be driven in either direction with equal vision of the right-of-way.

Another object is to so position the operator's cab so as to afford the operators maximum protective against injury from collision irrespective of the direction in which the locomotive is being run.

Another object is to provide for the transmission of draft and buffing forces between the articulated units independently of the center plate mounting of the units on the middle truck.

These and other detail objects as will appear below are attained by the construction illustrated in the accompanying drawings, in which:

Figure 1 is a top view of two pivotally connected frames mounted upon three four-wheel motor trucks. Diesel engine, electric generators and auxiliary equipment are indicated in dot and dash lines. Also, the frames are shown at an angle to each other in dot and dash lines in the position assumed when the locomotive is operating on short radius curved track.

Figure 2 is a side elevation of the construction shown in Figure 1 and includes an outline of the support structure.

Figure 3 is a detail side view and longitudinal central section of the central truck and superimposed structure and is taken approximately on the line 3—3 of Figure 1.

Figure 4 is a transverse section taken on the line 4—4 of Figure 2.

Figure 5 is a detail truck and frame center plate assembly corresponding generally to that shown in Figure 3, but illustrating another form of the invention.

The frames of the articulated vehicle are indicated at 1 and 2. The inner end of frame 1 includes a center plate 3 (Figure 3) having a downwardly facing semi-spherical surface. The adjacent end of frame 2 includes a center plate 4 having an upwardly facing semi-spherical surface forming a bearing for center plate 3. The lower portion 5 of center plate 4 forms a downwardly facing flat circular disc.

Frames 1 and 2 are mounted upon trucks 6, 7, and 8, trucks 6 and 8 being under the outer end portions of frames 1 and 2, respectively, and truck 7 being under the articulated ends of frames 1 and 2. Each of the trucks is of well-known construction and comprises a pair of spaced axles 9 with wheels 10, journal boxes 11, carrying drop equalizers 12, mounting leaf springs 13 and coil springs 14 which support the truck frame 15, including a bolster portion 16 provided with an upwardly facing center plate 17 having a flat dishlike upper contour receiving the downwardly facing portion of the associated body center plate frame.

Center plate members 3 and 4 are so constructed and arranged that their vertically disposed interengaging surfaces facing longitudinally of the locomotive are at or close to the level of the center line of thrust B' between the draft gear couplers B at the outer ends of the frames by which the vehicle is connected to adjacent vehicles.

If there were a substantial difference between the level of the center line of the draft gear couplers and the horizontal center line of the interengaging spherical surfaces of the center plates, the accompanying eccentricity due to buff and draft forces would result in reduced or additional axle load on the center truck, depending upon the relative heights of the center lines and whether the force is a draft or buffing force. With the relation between these lines as in the present structure, such eccentricity and variation in axle load is avoided.

Each frame 1 and 2 has an end center plate 20, having a lower contour corresponding to that indicated at 5 in Figure 3 and is provided with a similar center pin 21, but obviously omitting the concave upper face required in center plate 4 for the adjacent frame center plate member 3.

With this construction, trucks 6, 7, and 8 are interchangeable, which means that a single design of replacement truck may be substituted for any one of trucks 6, 7, and 8, which must be removed for repairs, thus making it unnecessary for a railroad to stock two different types of trucks at each of its shops where it would be likely to service the locomotive.

Each truck is provided with a pair of electric motors operatively connected to individual axles and each motor is positioned between the axle to which it is connected and the adjacent side of the truck frame bolster portion 16. The motor housings are indicated at 22 and the inner end of each housing is spring-supported on brackets projecting from the side of the bolster portion in the usual manner.

Preferably each frame 1 and 2 carries a diesel engine D, D', an electric generator G, G', electrically connected to the truck motors, and auxiliary equipment A, A', all provided with a suitable enclosure E, E', respectively. There is a substantial space between the adjacent ends of enclosures E, E' and this space is occupied by a cab C, carried on outrigger-like projections 23 extending from a part of frame 2 spaced inwardly from the extreme end portion of the frame overlying the truck center plate and pivotally connected to the other end frame. Cab C is spaced upwardly from the middle center plate and projects transversely of the longitudinal center line of the locomotive beyond enclosures E, E', sufficiently to afford the operator's vision lengthwise of the locomotive and beyond the ends of the locomotive, as indicated by the windows W (Figure 4). With this arrangement, the operator's vision is equally clear irrespective of the direction in which the locomotive is being run, which is a substantial advantage for engines operated in switching service.

The positioning of the cab intermediate the ends of the locomotive also affords the operator maximum protection from injury in the event of an end to end collision as substantially the entire frame structure and all of the engine, generator, and auxiliary equipment is between the cab and the colliding vehicle or other object.

Figure 5 illustrates another construction at the adjacent ends of the frames in which the supporting center plate members of the frames are relieved of draft and buff forces.

The right hand end of frame 31 is received between upper and lower jaws 32, 33 of frame 34. The lower jaw 33 of frame 34 has a downwardly facing center plate contour corresponding to that shown in Figure 3 and similarly adapted to fit into the truck center plate 17a. The upwardly facing contour of jaw 33 is a segment of a sphere but is not as deep as the corresponding portion 4 of frame 2 shown in Figure 3. The right hand end of frame 31 has a downwardly facing convex spherical segment 35 with a large diameter vertical passageway receiving a center pin 36. The passageway has an upwardly facing annular shoulder 37 and a renewable lower annular bearing 38 is seated on this shoulder and an upper annular bearing 39 rests on bearing 38. Elements 38 and 39 form a spherical segment bearing for a ball-shaped member 40 having a vertical passage for center pin 36. A depending cylindrical collar 41 on member 40 coacts with an upstanding cylindrical collar 42 on jaws 33 to form an extended bearing for the center pin.

A renewable cylindrical bearing 43 is carried by upper jaws 32 and forms an extended bearing for the upper end of pin 36. Clips 44 and 45 retain pin 36 and the upper bearing 39, respectively, in the assembled position shown.

When bearing 43 and pin 36 are removed, the left hand frame 31 may be raised to clear lower jaw 33 and withdrawn from between jaws 32 and 33.

Preferably the center of ball member 40 is the same as the center of the spherical elements of center plates 33 and 35. The vertical axes of the supporting center plate parts 33, 35 is the same as the vertical and horizontal axes of the buff and draft transmitting members 38, 39, and 40. Hence, frames 31 and 34 may pivot freely to accommodate travel of the vehicle on curved track and on entering and leaving adjacent portions of level and banked rails and these spherical bearings also accommodate relative vertical inclination of the frames or relative inclination of the rails supporting any two of the three trucks.

While the above description relates to a locomotive, some of the novel features described may be embodied in vehicles other than locomotives and unless the parts specified are necessarily locomotive parts it is not intended to limit the claims to a locomotive.

The details of the construction may be varied otherwise than as illustrated and described without departing from the spirit of the invention and the exclusive use of those modifications coming within the scope of the claims is contemplated.

What is claimed is:

1. In a railway articulated vehicle framing structure comprising separate frames arranged end to end with centrally projecting overlapping end portions directly connected to each other by a vertical pivot pin, a central truck supporting said end portions and arranged to swivel about the axis of said pin, end trucks supporting the remote ends of said frames, and an operator's cab mounted on said structure directly above and spaced from said frame end portions and said central truck and from said pivot pin.

2. In a railway articulated vehicle, frames arranged end to end with rigid extensions terminating in supporting and supported center plates respectively at their adjacent ends, a central truck pivotally supporting the lower supporting center plate, the center plates and the support for the lower center plate having a common vertical axis, individual end trucks supportinng the remote ends of said frames, and an operator's cab positioned directly above said center plates, there being electric generator and auxiliary mechanism on said frames and enclosures therefor in front of and at the rear of said cab, said cab projecting transversely of the length of the vehicle beyond said enclosures and there provided with openings to afford the operator vision forwardly and rearwardly of the cab at the sides of all of said generator and auxiliary mechanism and beyond the ends of the vehicle.

3. In a railway articulated vehicle, individual load-carrying frames, ararnged end to end but provided with longitudinally projecting center plates, one overlying the other and forming a pivotal connection between the frames, a central truck having a center plate supporting said vehicle body center plates, said body and truck center plates having a single common upright axis, end trucks supporting the remote ends of said vehicle body frames, an out-rigger like structure carried by one of said frames and extending from a portion of the latter spaced from its center plate upwardly and over and clear of all of said center plates and the adjacent frame, and an operator's cab supported on said structure.

References Cited in the file of this patent

UNITED STATES PATENTS

| | | |
|---|---|---|
| 1,412,053 | Gresley | Apr. 11, 1922 |
| 1,412,075 | Way | Apr. 11, 1922 |
| 1,459,250 | Pflager | June 19, 1923 |
| 1,888,822 | Frede et al. | Nov. 22, 1932 |
| 2,056,227 | Mussey et al. | Oct. 6, 1936 |
| 2,079,748 | Blomberg | May 11, 1937 |
| 2,090,988 | Snyder | Aug. 24, 1937 |
| 2,107,841 | Seider | Feb. 8, 1938 |
| 2,138,139 | Burkhardt | Nov. 29, 1938 |
| 2,216,547 | Christianson | Oct. 1, 1940 |
| 2,274,471 | Breer | Feb. 24, 1942 |

FOREIGN PATENTS

| | | |
|---|---|---|
| 388,717 | England | Mar. 2, 1933 |